Jan. 11, 1944.    G. FAST    2,338,758
SHAFT COUPLING
Filed June 23, 1942    3 Sheets-Sheet 2

INVENTOR.
GUSTAVE FAST
BY
ATTORNEY.

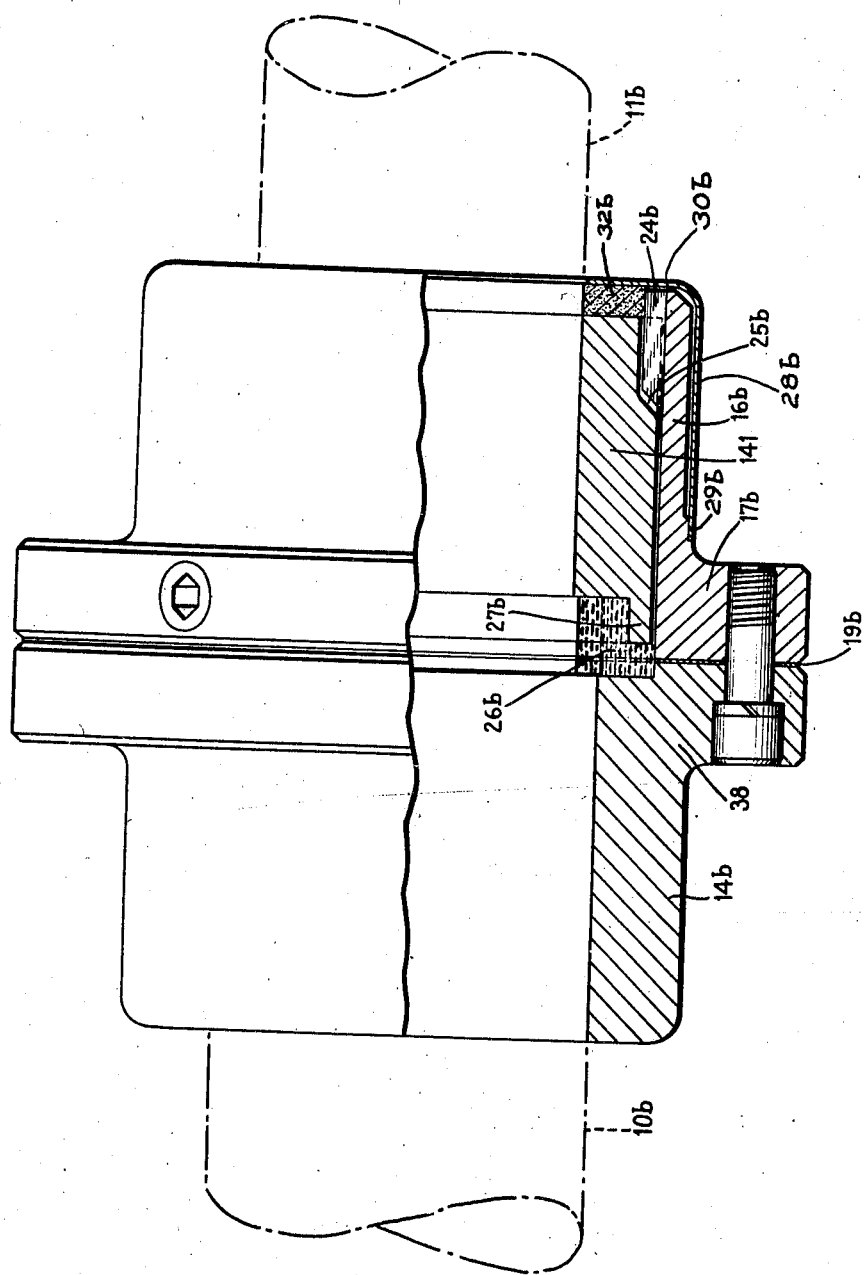

Patented Jan. 11, 1944

2,338,758

UNITED STATES PATENT OFFICE 2,338,758

SHAFT COUPLING

Gustave Fast, Annapolis, Md., assignor of one-half to Christiane Ganna Fast, Annapolis, Md.

Application June 23, 1942, Serial No. 448,098

14 Claims. (Cl. 64—9)

This invention relates to shaft couplings and more particularly to self-aligning couplings adapted to transmit a torque from one shaft to another through the interengagement of teeth or splined formations on metallic members.

An object of the invention has been to provide a simple, compact and inexpensive coupling of the character set forth, capable of transmitting large torques.

Another object of the invention has been to provide a coupling of minimum diameter or dimension in relation to the size of the shafts connected together thereby. The capacity of a coupling of given size is thus increased.

A further object of the invention has been to provide a coupling of the character indicated which is adapted to retain an adequate supply of lubricant to insure thorough lubrication of the load transmitting surfaces at all times during the operation of the coupling. Toward this end the most effective utilization possible is made of the space available for the storage of lubricant without danger of leakage when the coupling is at rest. Special provisions are also made to insure the delivery of this lubricant to the surfaces requiring it when the coupling is in operation.

Other objects, features and advantages of the invention will appear from a detailed description of several illustrative embodiments of the same which will now be given in conjunction with the accompanying drawings, in which:

Fig. 4 is a view partly in side elevation and partly in axial section through a further modified form of coupling.

Figure 1:
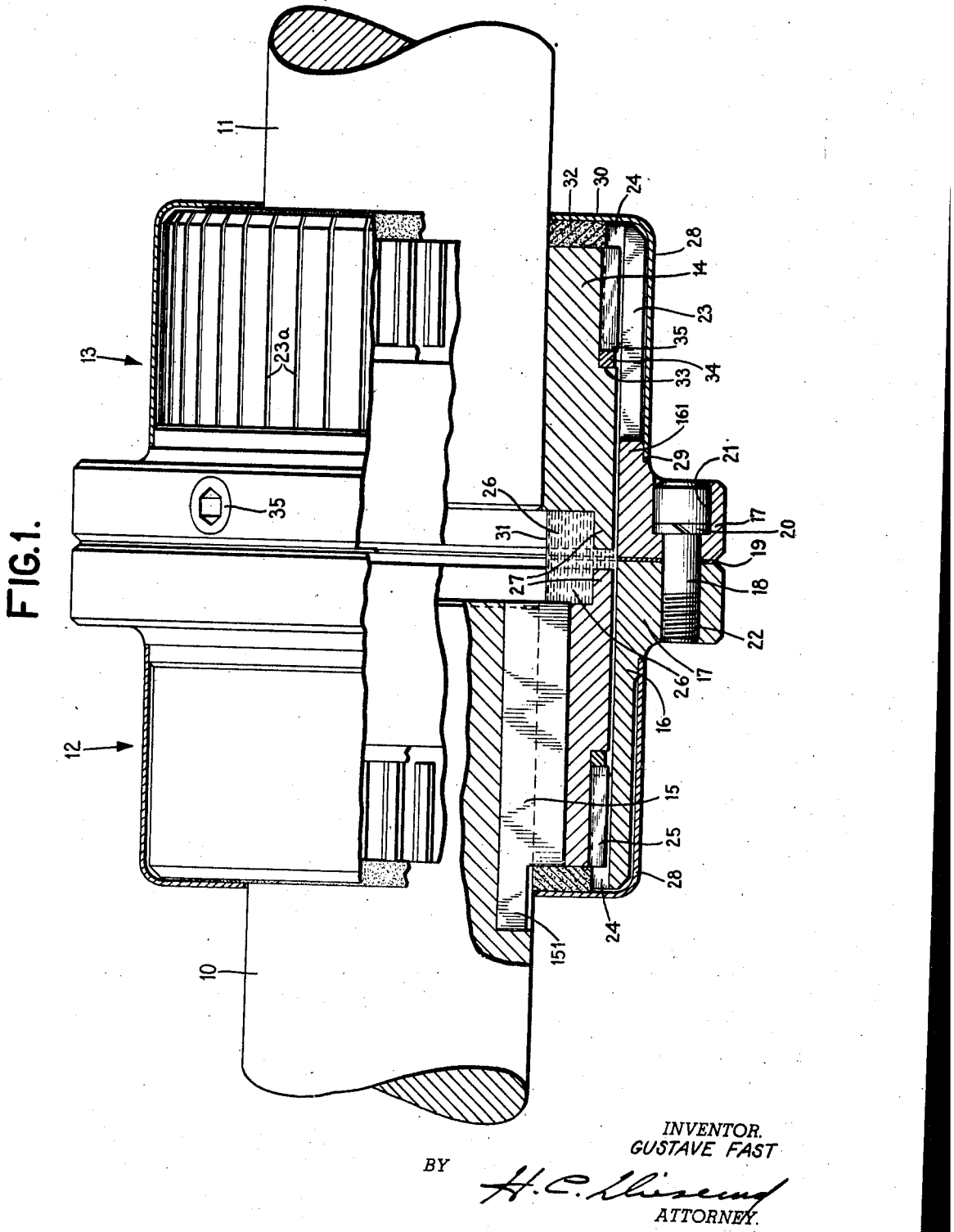
Fig. 1 is a view partly in side elevation and partly in axial section through a coupling embodying two different forms of the invention at its two ends, certain portions of the construction being broken away for the purposes of better illustration of other parts.
Figure 2:
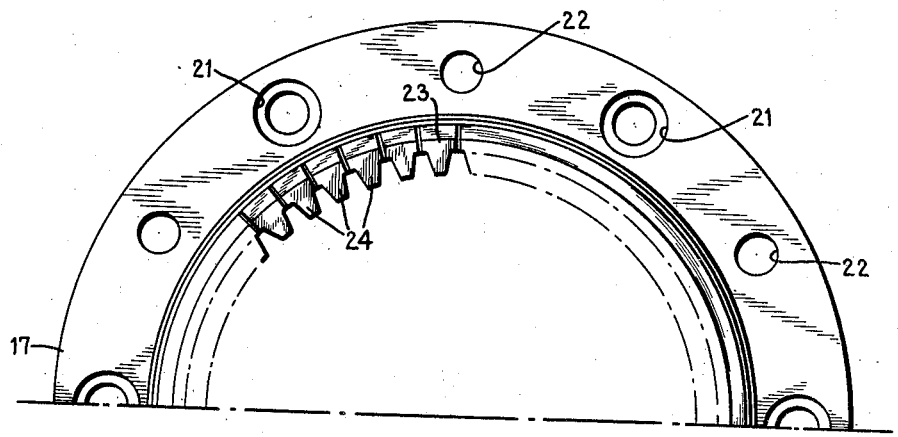
Fig. 2 is an outer end view of the upper half of one of the coupling members disclosed in Fig. 1.

Referring now to Figs. 1 and 2, let it be assumed that the improved coupling is adapted to transmit a torque between a pair of shafts 10 and 11 which are in substantial alignment but which, as will be understood, will almost invariably be slightly out of line, either by having their axes angled slightly with relation to each other or by having such axes slightly offset and parallel or by a combination of both types of misalignment. In the coupling of two such shafts associated with driving and driven machines, or the like, it will ordinarily be desirable to provide a double engagement type coupling, such as illustrated in Fig. 1. According to the invention, a coupling of this character is preferably formed of a pair of identical parts. However, for the purpose of simplifying the illustration of several modifications, the two halves of the coupling are shown in Fig. 1 as being of different types. While the two different constructions may be used, if desired, duplicate parts will ordinarily be employed for the two ends of the coupling which are designated generally by the numbers 12 and 13 in Fig. 1.

Each shaft to be coupled is provided with a hub 14 which may, if desired, be simply pressed onto the shaft so that the transmission of torque will depend upon the friction between the shaft and the hub. However, for the transmission of heavy torques, it is desirable to provide a key 15 in suitable keyways or slots formed in the shaft and in the hub. This key, as indicated in Fig. 1, preferably has a portion 151 extending beyond the main body of the key which cooperates with the keyway in the hub. The extension cooperates merely with the keyway in the shaft and is flush with or below the surface of the latter.

Surrounding each hub 14 is a coupling sleeve 16 or 161, each having a radially extending flange 17 at its inner end. Bolts or cap screws 18 may be provided for clamping the two flanges together, a gasket 19 being employed between the flanges to provide an oil-tight joint. A lock washer 20 may be employed between the head of the cap screw and the bottom of a recess 21 into which said head snugly fits. In order to make the two sleeves interchangeable, each may be provided with a number of recesses 21 and also with a number of threaded openings 22 adapted to receive the opposite ends of the screws. The recesses and threaded openings may be alternately arranged, say six of each being provided.

Sleeve 16, as shown at the left of the coupling, may be formed as a continuous cylinder which is sufficiently thin and flexible in a radial direction to be capable of responding to radial forces developed in the transmission of a torque, in the manner to be explained. The sleeve 161, however, illustrative of another type of construction, is formed of a plurality of axially extending sections 23 separated from one another by slots 23a.

These slots extend from a point near the flange 17 to the outer end of the sleeve. Adjacent its outer end each sleeve is provided with a toothed or splined formation 24 adapted to mesh or cooperate with a toothed or splined formation 25 in the outer surface of the hub 14. As indicated in Fig. 1, a slight bottom clearance is provided between the teeth 24 and 25, particularly when the construction is like that of sleeve 16. Moreover, the cooperating faces of these teeth are preferably inclined to a radial plane extending from the axis of the shaft in order to provide a suitable pressure angle. The pressure angle or the inclination of said cooperating faces may suitably be between 20 and 30 degrees, especially for sleeve 16, as set forth in my pending application Ser. No. 378,155, filed February 10, 1941.

Accordingly, as set forth in said pending application, a load transmitted between the teeth 24 and 25, having an outward component due to the pressure angle of the load transmitting faces, will tend to flex radially the outer end of the cylindrical or ring-like portion of sleeve 16. Therefore, if the teeth 24 and 25 are engaged at only two diametrically opposite points at the commencement of the application of a load, because of a slight misalignment of the two coupled shafts, the radial flexibility of the sleeve will permit a slight, but sufficient, distortion to bring substantially all of the teeth into driving engagement. Moreover, in the construction of the sleeve 161, the cantilever spring action of the sections 23 will impart a certain amount of circumferential flexibility and hence torsional resilience to the coupling and will also assist thereby in providing more complete engagement between the teeth 24 and 25. If desired, the torsional resilience of sleeve 161 or the radial flexibility of the sleeve 16 may be eliminated. The radial flexibility may be eliminated, when desired, by increasing the wall thickness of the ring-like or cylindrical portion of the sleeve to such an extent that it will not flex under the load transmitted or by otherwise stiffening or confining the tooth portion of this member in a radial direction.

Turning now to the lubrication features of the construction, the adjacent ends of the hubs 14 have their radially inward portions cut away to provide a lubricant storage space 26 between the two hubs and extensions 27 radially outward of the storage space. The capacity of the segmental space so provided, up to the plane of the bottoms of the shafts, together with such other space as may be available below said plane, should be sufficient to provide a continuous ring of oil over the entire load transmitting surfaces of the teeth 24 and 25 when the coupling is being rotated. To insure adequate lubricant for this purpose, within a coupling of minimum diameter, provision is made for confining the lubricant as much as possible to the region of the teeth during the operation of the coupling. This purpose is served in part by the provision of the extensions 27 at the adjacent ends of the hubs 14. These extensions have their radially inward surfaces of the same diameter as the root diameter of the teeth 25 and their outer surfaces of the same diameter as the outer ends of the teeth 25. Thus, the extensions may be said to be axially alined with these teeth. The extensions are of such length that they have just sufficient clearance with respect to each other to permit the necessary angling of the hubs due to misalignment of the shafts. It will be clear that if the extensions 27 were not provided, a good portion of the lubricant in the space 26 would be required, during rotation of the coupling, to fill the annular space now occupied by these extensions.

To retain the lubricant, a shell or casing 28 is provided around each of the sleeves 16 and 161. This casing may be stamped or spun from sheet steel of relatively light weight and is preferably welded at its inner end 29 to a shoulder provided in the surface of the sleeve. It extends outwardly from this shoulder with a slight clearance from the ring-like body of sleeve 16 or the sections 23 of the sleeve 161. Beyond the outer end of the sleeve and the hub 14 the shell is turned inwardly to provide a radial flange 30 which extends almost to the periphery of the shaft 10 or 11. Only sufficient clearance is provided to enable the slight angling movements between the shaft and sleeve made necessary by the misalignment of the shafts. This construction allows the space 26 to be filled with lubricant substantially up to the plane of the bottom of the shafts, as indicated at 31, without danger of leakage when the shafts come to rest. Between the inturned flange 30 of each casing and the outer end of the hub 14 a packing ring 32 is provided. This is preferably formed of felt or the like and serves not only as a dust seal but also as an absorbent lubricant reservoir which increases the lubricant capacity of the casing. A substantial amount of lubricant may be retained by capillary action above the normal level in the space 26. Similar packing, either in the form of a ring or a complete disc, may be provided between the ends of the hubs 14 and also the shafts 10 and 11, if desired.

If the teeth 25 are formed in the manner indicated in Fig. 1, so that a space is provided between the inner ends of the teeth and a shoulder 33, to enable the withdrawal of the cutting tool, this space is preferably filled by a snap ring 34. However, if the teeth are formed by a hobbing operating, the snap ring is unnecessary since no such annular space need then be provided.

The lubricant may be introduced into the coupling by the removal of a screw plug 35 which is provided to seal an inlet opening through the rim of the flange 17 of one or both of the sleeves.

Figure 3:
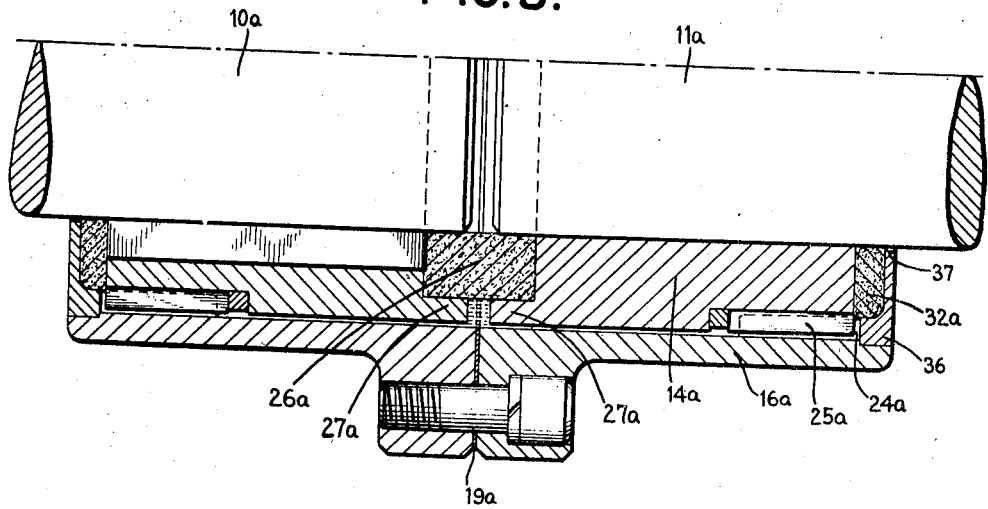
Fig. 3 is an axial sectional view through a coupling of modified construction, only the lower half being shown.

A modified construction is illustrated in Fig. 3. Here the shafts 10a and 11a have only a small clearance between their ends, sufficient to permit relative angling of the shafts in the event of misalignment. This space may be substantially the same, or slightly less than, that provided between the ends of extensions 27a of hub members 14a. The latter may be of the same form as hubs 14. In this modified construction the sleeves 16a, which are identical, are continuous ring-like or cylindrical members forming an enclosing housing so that the separate shells 28 of the Fig. 1 embodiment may be omitted. The sleeves 16a are substantially rigid or are made so by closure plates 36, one of which is provided at the end of each sleeve. These plates are secured in any suitable way, as by welding, to the inner face of the sleeve 16a. An opening 37 at the center of each of the plates 36 provides but slight clearance with the shaft 10a or 11a, as the case may be. In the space formed by the cut-away portions at the inner ends of the hubs 14a there may be provided suitable packing 26a formed of felt or the like, serving as an absorbent reservoir and thereby increasing the lubricant capacity of the coupling. It will be understood that this packing, as well as packing 32a provided between the plates 36 and the outer ends of the hubs 14a, will give up the lubricant, held therein by capillary attraction, and will throw this outwardly by centrifugal force to the space between the cooperating teeth 24a and 25a.

A still further modification is shown in Fig. 4. Here the invention is illustrated as applied to a single-engagement type of coupling. In this construction the shaft 10b of one machine to be coupled may be provided with a hub 14b having a radially extending flange 38 adapted to be bolted to the flange 17b of a sleeve member 16b which may suitably be of a construction similar to that of any of the sleeves 16, 161 and 16a. Within the sleeve 16b there is provided on the shaft 11b a hub 141. This hub, like the hub 14 of Fig. 1, is provided with an axial extension 27b at its inner end adapted to fill a portion of the space between the ends of the two hubs. The inner surface of this extension is axially aligned with the root circle of teeth 25b, formed in the outer end of hub 141, and the outer surface of the extension is axially aligned with the outer ends of these teeth. Teeth 25b may be formed by hobbing, thereby eliminating the annular space at the inner end of the teeth and the necessity of providing a snap ring, such as 34 in Fig. 1. The segmental space 26b beneath the bottom of the shaft 11b and between the ends of the hubs 14b and 141, minus the space occupied by extension 27b, is substantially of sufficient volume to retain the lubricant required to fill the space between and around the teeth 24b and 25b, and other empty spaces radially beyond the inner ends of these teeth, when the coupling is in operation. A shell or casing 28b, welded at 29b to the sleeve 16b and having a radially extending flange 30b at its outer end, assists in retaining the lubricant. As in the case of shell 28, a slight clearance is provided between the cylindrical wall of shell 28b and the outer end of sleeve 16b to allow for slight radial distortion of the latter. A packing ring 32b, acting as a dust seal and absorbent lubricant reservoir, may be employed between the flange 30b and the end of hub 141.

In the Fig. 4 embodiment, shaft 10b may, for example, be the driving member and the shaft 11b may simply be an extension shaft which is connected by a similar coupling at its opposite end to the shaft of a driven machine. Such a construction could be used wherever the machines to be coupled are spaced a substantial distance apart.

In all forms of the inventions, it will be observed that the hubs (14, 14a and 141) are of very simple and compact construction. Starting with a hollow cylinder, or bar stock if desired, a central opening is provided of just the right diameter to receive a shaft to be coupled. At one end of the hollow cylinder the teeth 25 are cut in, while at the opposite end an annular section is cut away, leaving the extension 27. These hubs are sturdy and capable of transmitting heavy torques. They allow the use of shafts of maximum diameter without danger of rupture due to stresses created by keys employed in the transmission of torque from the shafts to the hubs.

While a preferred form of the invention and several modifications thereof have been disclosed in considerable detail, it will be understood that various other changes may be made in the construction and arrangement of the several parts without departing from the principles and scope of the invention. Features described in connection with one embodiment may be utilized, whenever adaptable, in connection with any of the others. The terms and expressions used herein have been used as terms of description and not of limitation.

What I claim is:

1. A shaft coupling comprising a hub mounted on a shaft for rotation therewith, a key connecting said hub and shaft, said hub being solid between its outer surface and said key, a sleeve surrounding said hub, said sleeve and hub having inter-engaging projections and recesses adjacent their outer ends for the transmission of torque, said hub having an integral extension at its inner end in axial alinement with the projections at the outer end of the hub, the surface of said extension facing the axis of said shaft having a radius substantially equal to that of the base of said projections, and means secured to said sleeve for retaining a lubricant within the sleeve, said means comprising a part beyond the outer end of said hub extending radially inward toward said shaft, said part having only sufficient clearance from the shaft to permit the necessary relative movement therebetween due to misalinement of the coupled shafts.

2. A shaft coupling comprising a hub mounted on a shaft for rotation therewith, a key connecting said hub and shaft, said hub being solid between its outer surface and said key, a sleeve surrounding said hub, said sleeve and hub having inter-engaging projections and recesses adjacent their outer ends for the transmission of torque, said hub having an integral extension projecting directly from its inner end in axial alinement with the projections at the outer end of the hub, the outer and inner surfaces of said extension having radii substantially equal to those of the outer and inner ends, respectively, of said projections, and means carried by said sleeve for retaining sufficient lubricant to cover the entire area of contact between said inter-engaging projections and recesses when the coupling is in operation.

3. In a shaft coupling a hub comprising a solid annular ring having an inner surface adapted to tightly fit a shaft, the outer surface of said hub being cylindrical and having a toothed formation adjacent one end, said hub having an extension projecting directly from the opposite end of said solid ring, the outer surface of said extension being a continuation of the cylindrical outer surface of said hub and the inner surface of said extension having a diameter substantially equal to the root diameter of said toothed formation.

4. In a shaft coupling a hub comprising a solid annular ring having an inner surface adapted to tightly fit a shaft, the outer surface of said hub being cylindrical and having a toothed formation adjacent one end, said hub having an extension projecting directly from the opposite end of said solid ring, the outer surface of said extension being a continuation of the cylindrical outer surface of said hub and the inner surface of said extension having a diameter substantially equal to the root diameter of said toothed formation, a sleeve closely surrounding said hub and having a toothed formation meshing with said toothed formation on the hub, and means carried by said sleeve for retaining sufficient lubricant to cover the entire area of contact between said toothed formations when the coupling is in operation.

5. In a shaft coupling a hub comprising a solid annular ring having an inner surface adapted to tightly fit a shaft, the outer surface of said hub being cylindrical and having a toothed formation adjacent one end, said hub having an extension projecting directly from the opposite end of said solid ring, the outer surface of said extension being a continuation of the cylindrical outer surface of said hub and the inner surface of said extension having a diameter substantially equal to the root diameter of said toothed formation, a sleeve closely surrounding said hub and having a toothed formation meshing with said toothed formation on the hub, and means carried by said sleeve for retaining a lubricant around said toothed formations, said means extending inwardly substantially to said shaft beyond the end of said hub.

6. In a shaft coupling a hub comprising a solid annular ring having an inner surface adapted to tightly fit a shaft, the outer surface of said hub being cylindrical and having a toothed formation adjacent one end, said hub having an extension projecting directly from the opposite end of said solid ring, the outer surface of said extension being a continuation of the cylindrical outer surface of said hub and the inner surface of said extension having a diameter substantially equal to the root diameter of said toothed formation, a sleeve closely surrounding said hub and having a toothed formation meshing with said toothed formation on the hub, said sleeve being radially flexible in the region of said toothed formations, said formations being constructed and arranged to impart a radially outward component of force to said sleeve in the transmission of a torque, and means carried by said sleeve for retaining a lubricant around said toothed formations.

7. In a shaft coupling a hub comprising a solid annular ring having an inner surface adapted to tightly fit a shaft, the outer surface of said hub being cylindrical and having a toothed formation adjacent one end, said hub having an extension projecting directly from the opposite end of said solid ring, the outer surface of said extension being a continuation of the cylindrical outer surface of said hub and the inner surface of said extension having a diameter substantially equal to the root diameter of said toothed formation, a sleeve closely surrounding said hub and having a toothed formation meshing with said toothed formation on the hub, said sleeve being slotted to divide the same into a plurality of sections in the region of said toothed formations, and means carried by said sleeve for retaining a lubricant around said toothed formations.

8. In a shaft coupling a hub comprising a solid annular ring having an inner surface adapted to tightly fit a shaft, the outer surface of said hub being cylindrical and having a toothed formation adjacent one end, said hub having an extension projecting directly from the opposite end of said solid ring, the outer surface of said extension being a continuation of the cylindrical outer surface of said hub and the inner surface of said extension having a diameter substantially equal to the root diameter of said toothed formation, a sleeve closely surrounding said hub and having a toothed formation meshing with said toothed formation on the hub, said sleeve being slotted in the region of said toothed formations to divide the same into a plurality of cantilever sections having torsional resilience, and means carried by said sleeve for retaining a lubricant around said toothed formations.

9. In a shaft coupling a hub comprising a solid annular ring having an inner cylindrical surface adapted to tightly fit a shaft, the outer surface of said hub also being cylindrical and having a toothed formation adjacent one end, said hub having an extension projecting directly from the opposite end of said solid ring, the outer surface of said extension being a continuation of the cylindrical outer surface of said hub and the inner surface of said extension having a diameter substantially equal to the root diameter of said toothed formation, a sleeve closely surrounding said sub and having a toothed formation meshing with said toothed formation on the hub, means carried by said sleeve for retaining a lubricant around said toothed formations, said means extending inwardly substantially to said shaft beyond the end of said hub, and absorbent means between said first mentioned means and the end of said hub forming a combined dust seal and lubricant reservoir.

10. A shaft coupling for a pair of substantially alined shafts which comprises a substantially solid hub mounted on each shaft for rotation therewith, the major portions of the inner ends of said hubs being spaced to provide a pocket therebetween, sleeve means closely surrounding said hubs and having toothed engagement with each of the same, means carried by said sleeve means for retaining a lubricant around said hubs and in said pocket between the hubs, said last recited means extending substantially to the surfaces of said shafts beyond the ends of said hubs, and extensions projecting directly from the inner ends of said hubs for displacing lubricant from a portion of said pocket alined axially with said toothed engagement.

11. A shaft coupling for a pair of substantially alined shafts which comprises a hub mounted on each shaft for rotation therewith, the inner ends of said hubs being relatively close together adjacent their peripheries but having cut-away portions serving to provide a space between the hubs inwardly of their peripheries, sleeve means surrounding said hubs, said sleeve means and hubs having inter-engaging toothed formations adjacent their outer ends for the transmission of torque therebetween, said toothed formations having inclined load transmitting surfaces arranged to produce a radial component of force in the transmission of torque, said sleeves being radially flexible in the region of said toothed formations and capable of distortion in response to said radial component of force, and lubricant retaining means carried by said sleeves and spaced therefrom in the region of said toothed formations.

12. A shaft coupling for a pair of substantially alined shafts which comprises a hub mounted on each shaft for rotation therewith, the inner ends of said hubs being relatively close together adjacent their peripheries but having cut-away portions serving to provide a space between the hubs inwardly of their peripheries, sleeve means surrounding each of said hubs, means connecting said sleeve means together for the transmission of torque and forming an oil-tight joint therebetween, said sleeve means and hubs having inter-engaging toothed formations adjacent their outer ends for the transmission of torque therebetween, said toothed formations having inclined load-transmitting surfaces arranged to produce a radial component of force in the transmission of torque, said sleeves being radially flexible in the region of said toothed formations and capable of distortion in response to said radial component of force, and a lubricant retaining shell secured to each of said sleeve means and having a flange at its outer end beyond said sleeve means and hub extending substantially into engagement with the related shaft.

13. A shaft coupling comprising a hub mounted on a shaft for rotation therewith, a key connecting said hub and shaft, said hub being solid between its outer surface and said key, a sleeve surrounding said hub, said sleeve and hub having inter-engaging projections and recesses adjacent their outer ends for the transmission of torque, an annular recess in the periphery of said hub adjacent the inner end of the projections thereon, a ring filling said recess, said hub having an integral extension at its inner end in axial alinement with the projections at the outer end of the hub, the surface of said extension facing the axis of said shaft having a radius substantially equal to that of the base of said projections, and means secured to said sleeve for retaining a lubricant within the sleeve, said means comprising a part beyond the outer end of said hub extending radially inward toward said shaft, said part having only sufficient clearance from the shaft to permit the necessary relative movement therebetween due to misalinement of the coupled shafts.

14. In a coupling for a pair of substantially alined shafts, a hub on each shaft for rotation therewith, a key connecting each hub with its shaft, said hubs being solid between their outer surfaces and said key, a pair of interconnected sleeves surrounding said hubs, said sleeves and hubs having inter-engaging projections and recesses adjacent their outer ends for the transmission of torque, said hubs having extensions integral therewith and projecting toward each other in axial alinement with said projections at the outer ends thereof, and means extending inwardly from the outer ends of said sleeves substantially into engagement with said shafts beyond the outer ends of said hubs, said means cooperating with said sleeves to retain sufficient lubricant for the entire area of contact between said inter-engaging projections and recesses.

GUSTAVE FAST.